United States Patent

[11] 3,582,670

[72] Inventor Paul J. Weaver
San Marino, Calif.
[21] Appl. No. 807,639
[22] Filed Mar. 17, 1969
[45] Patented June 1, 1971
[73] Assignee Automatic Control Systems, Inc.
El Monte, Calif.

[54] MULTICHANNEL SEQUENCING SYSTEM
5 Claims, 2 Drawing Figs.
[52] U.S. Cl. .................................................. 307/112,
90/13
[51] Int. Cl. ...................................................... A02b 1/24
[50] Field of Search ........................................... 200/153.13,
38 E; 90/13 (99); 307/112

[56] References Cited
UNITED STATES PATENTS
2,384,809 9/1945 Bullard et al. ................. 90/13(.99)

Primary Examiner—David Smith, Jr.
Attorney—Angus & Mon

ABSTRACT: A multichannel sequencing system for a machine tool element which is shiftable along a respective axis. A rotatable drum has an axis of rotation and an axially extending surface in which there is a plurality of axially extending slots with stop means axially slideably engaged in the slots. Track means extends axially adjacent to the slots and bear switch means which are operable by engagement with the stops. This switch means is interconnectable with the machine tool element in order that its axial movement will be proportional to that of its respective machine tool element. Second switch means is associated with a moveable surface whose position is indexed to the rotary position of the drum so as to actuate the second switch means when the first switch means is to be effective. A plurality of axes of machine tool elements may be controlled by providing more than one drum and more than one of said second switch means.

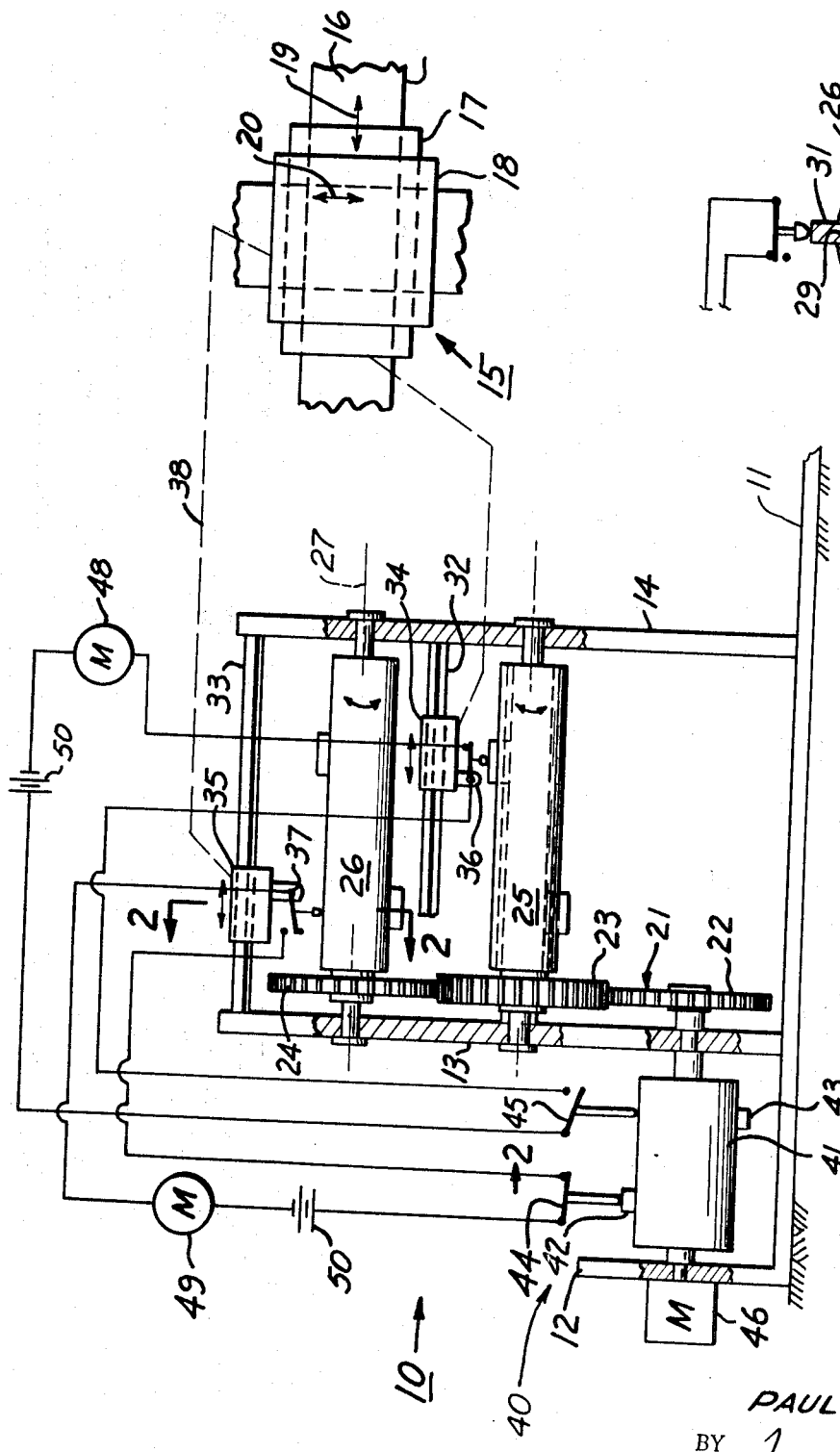
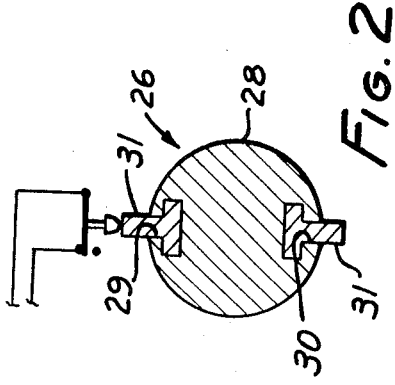
INVENTOR.
PAUL J. WEAVER
BY
*Angus & Mon*
ATTORNEYS.

MULTICHANNEL SEQUENCING SYSTEM

This invention relates to the control of machine tool elements such as carriages. It is known to provide sequential controls for the operation of machine tools so that their motion will be stopped or otherwise sequenced by limitations determined by machine tool motions. An example of one such control is shown in Paul J. Weaver U.S. Pat. No. 3,272,039, issued Sept. 13, 1966, entitled "Machine Tool Cycle Control." This cycle control is useful and functional, but as is characteristic of the prior art, it requires considerable effort to establish the position of the limit switches for an individual setup. It is an object of this invention to provide a multichannel sequencing system wherein motion-limiting devices can be set up on a simple drum, and indexing accomplished between operations such that the set up of the machine for cycling requires no more than the simple adjustments of a group of stops on a device removed from the machine tool element itself.

The invention is accomplished by providing a rotatable drum having axially extending slots with stops therein. First switch means moves axially in response to a proportional motion of the machine tool element and is engageable with the first switch means to establish an open or closed position thereof. The drum is rotatable so as to be moved from slot to slot (channel to channel) as the control program moves along. Similarly there is second switch means associated with a moveable surface which determines which if any of the first switch means is to be effective at any given time.

The above and other features of this invention will be fully understood from the following detailed description and the accompanying drawings in which:

FIG. 1 is a side elevation partly in cut away cross section showing the presently preferred embodiment of the invention; and FIG. 2 is a cross section taken at line 2—2 of FIG. 1.

A multichannel sequencing system 10 can, as is shown in FIG. 1, be built upon a base 11 with three upright sideplates 12, 13, 14. This base will be formed adjacent to a machine tool element 15 which in this case is shown as including a base ways 16 with a saddle 17 and a cross-slide 18 in the form common to milling machines.

Saddle 17 moves along axis 19 and a cross-slide 18 moves along axis 20, these being at right angles to each other. A gear train 21 is journaled to sideplate 13 and includes a drive gear 22 and two driven gears 23, 24. The driven gears in turn are drivingly connected to rotatable drums 25, 26 respectively so that as the drive gear turns, drums 25 and 26 move through equal angular increments. Drum 26 is shown in detail, it being exemplary of drum 25 as well.

Drum 26 is journaled between sideplates 13 and 14 and is driven by gear 24. It has an axis 27 around which an external cylindrical surface 28 rotates. The surface need not be strictly cylindrical, and in fact is arbitrary in shape, but it is conveniently made so that when a large number of channels are provided, it provides a uniform lateral projection at its periphery. In this case, for illustration, only two channels are provided which are in the form of slots 29, 30 that extend axially along the drum. As many as 70 channels can be used, and the more that are used, the closer the surface is to cylindrical.

The slots extend axially along the drum and each bears a respective stop 31. These stops are axially positionable along the slots.

Two tracks 32, 33 extend axially adjacent to drums 25 and 26 respectively. Each bears a carriage 34, 35 respectively and the carriages bear a respective first switch 36, 37 which is adaptable to contact the stop to move it to one control position as shown for switch 36, or to be out of contact with it as shown for switch 37. This thereby forms a control feature for an associated circuit.

Carriage 34 is responsive to the movement of the saddle 17 and is preferably aligned and directly interconnected therewith. Carriage 35 is responsive to the motion of cross-slide 18 and may conveniently be connected thereto by a push-pull cable linkage 38 (shown schematically). Both carriages are responsive to the motion of a respective machine tool element, and it will thereby be seen that interruption or cycling operations responsive to the position of said element can be accomplished by appropriately positioning the stops, and of indexing their angular position to be adjacent to the respective track when it is desired to place them in service. This constitutes a channel selection.

Second switch means 40 is provided adjacent to a moveable surface 41. It is shown as a drum with protuberances 42, 43 selectively positioned in peripheral bands. As can be seen, the second switch means includes switches 44, 45 which have settings respective to the presence or absence of said protuberances. Alternatively, punched tape readers or the like could be used instead. A stepper motor 46 drives the system to change from channel to channel, and the rotation of all elements is included on a one-to-one basis.

The system is shown controlling two drive motors 48, 49 which respectively drive the saddle and the cross-slide. Power sources 50 are shown in circuits which include sequentially the first and second switch means.

The operation of the system will be evident from the foregoing. The stepper motor is operated to bring a channel into indexed registration with the respective first switch means, and the second switch means are actuated or not as established by the program. When the machine tool begins to operate accordingly its motion will be limited or cycling initiated by a change in condition of the first switch means, which is of course determined by the position of the element which it is controlling. The device is simple. It requires only a single limit switch (first switch means) for each axis of motion, can accommodate as many channels as desired, and can be expanded to control any number of axes of motion.

What I claim is:

1. A multichannel sequencing system for a machine tool element which is shiftable along a respective axis, said system comprising: a rotatable drum having an axis of rotation and an axially extending bounding surface; a plurality of axially extending slots in said bounding surface, said slots being angularly spaced apart from one another; stop means axially slideably engaged in each of said slots; track means extending axially adjacent and parallel to said surface; first switch means having two control conditions and axially slideably mounted to said track means and carried thereby so as to be engageable with the said stop means to assume one control condition, and to clear the stop means at another axial position to assume another control condition, the first switch means being physically interconnectable with the machine tool element in order that its axial movement will be proportional to that of the machine tool element, a second switch means in serial connection with the first switch means, a moveable surface whose position relative to the second switch means is indexed to the rotary position of the drum, whereby different portions of the moveable surface are respectively aligned with the second switch means when respective slots are aligned with the first switch means, and actuating means carried by the moveable surface to actuate the second switch means when the first switch means is to be effective.

2. A system according to claim 1 in which the moveable surface forms the periphery of a rotatable drum, both of said drums being mutually engaged for indexed, concurrent stepwise rotation.

3. A system according to claim 1 in which the drum axis and the axis of motion of the machine tool element are nonparallel, and the first switch means is linked to the machine tool element by a flexible push-pull cable.

4. A system according to claim 1 in which a plurality of said rotatable drums is provided, one for each of a plurality of axes of motion of a respective machine tool element, and in which first and second switch means is provided for all of said rotatable drums.

5. A system according to claim 4 in which there are two machine tool element axes, and in which one of said rotatable drums is parallel to one of said axes, and the respective first switch means is directly linked to the machine tool element, and in which the other rotatable drum is nonparallel to either axis, and the respective first switch means is linked to the machine tool element by a flexible push-pull cable.